US012528986B2

United States Patent
Aoki et al.

(10) Patent No.: US 12,528,986 B2
(45) Date of Patent: Jan. 20, 2026

(54) CORE-SHELL TYPE QUANTUM DOT AND METHOD FOR MANUFACTURING CORE-SHELL TYPE QUANTUM DOT

(71) Applicant: SHIN-ETSU CHEMICAL CO., LTD., Tokyo (JP)

(72) Inventors: Shinji Aoki, Annaka (JP); Yoshihiro Nojima, Annaka (JP); Kazuya Tobishima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 862 days.

(21) Appl. No.: 17/777,693

(22) PCT Filed: Sep. 30, 2020

(86) PCT No.: PCT/JP2020/037308
§ 371 (c)(1),
(2) Date: May 18, 2022

(87) PCT Pub. No.: WO2021/106362
PCT Pub. Date: Jun. 3, 2021

(65) Prior Publication Data
US 2022/0403241 A1    Dec. 22, 2022

(30) Foreign Application Priority Data
Nov. 29, 2019    (JP) .................................. 2019-216307

(51) Int. Cl.
| | | |
|---|---|---|
| *C09K 11/88* | (2006.01) | |
| *B82Y 20/00* | (2011.01) | |
| *B82Y 40/00* | (2011.01) | |
| *C09K 11/08* | (2006.01) | |
| *C09K 11/70* | (2006.01) | |

(52) U.S. Cl.
CPC ............ *C09K 11/883* (2013.01); *B82Y 20/00* (2013.01); *B82Y 40/00* (2013.01); *C09K 11/0883* (2013.01); *C09K 11/703* (2013.01)

(58) Field of Classification Search
CPC .. C09K 11/883; C09K 11/703; C09K 11/0883
See application file for complete search history.

(56) References Cited

U.S. PATENT DOCUMENTS

| | | |
|---|---|---|
| 2008/0258159 A1 | 10/2008 | Jun et al. |
| 2010/0283005 A1 | 11/2010 | Pickett et al. |
| 2012/0288713 A1 | 11/2012 | Jun et al. |
| 2017/0218268 A1 | 8/2017 | Pickett et al. |
| 2018/0301592 A1 | 10/2018 | Peng et al. |
| 2019/0211262 A1* | 7/2019 | Park ..................... C09K 11/883 |

FOREIGN PATENT DOCUMENTS

| | | |
|---|---|---|
| CN | 101815774 A | 8/2010 |
| CN | 110028963 A | 7/2019 |
| JP | 2018-65738 A | 4/2018 |
| KR | 10-2019-0085884 A | 7/2019 |

OTHER PUBLICATIONS

Aug. 23, 2022 Office Action issued in Japanese Patent Application No. 2019-216307.
Nov. 24, 2020 International Search Report issued in International Patent Application No. PCT/JP2020/037308.
May 17, 2022 International Preliminary Report on Patentability issued in International Patent Application No. PCT/JP2020/037308.
Nozik et al., "Highly efficient band-edge emission from InP quantum dots" Appl. Phys. Lett. 68, pp. 3150-3152, May 27, 1996.
Park et al., "Highly luminescent InP/GaP/ZnS QDs emitting in the entire color range via a heating up process," Scientific Reports, vol. 6:30094, 2016.
Li Yang et al., "Stoichiometry-controlled InP-Based Quantum Dots: Synthesis, Photoluminescence, and Electroluminescence," J. Am. Chem. Soc. 2019, 141, 6448-6452.
Aug. 8, 2024 Office Action issued in Korean Patent Application No. 10-2022-7016541.
Dec. 4, 2023 Office Action and Search Report issued in Chinese Patent Application No. 202080082454.1.

* cited by examiner

Primary Examiner — C Melissa Koslow
(74) Attorney, Agent, or Firm — Oliff PLC

(57) ABSTRACT

A core-shell type quantum dot comprising, a semiconductor nanocrystal core including at least In and P, and having group III-V elements as constituent elements and a single or a plurality of semiconductor nanocrystal shells having group II-VI elements as constituent elements covering the semiconductor nanocrystal core, wherein a buffer layer comprising semiconductor nanocrystals having group II-V elements as constituent elements is included between the semiconductor nanocrystal core and the semiconductor nanocrystal shell. As a result, quantum dots using group II-V semiconductor nanocrystals as a core and having improved fluorescence emission efficiency are provided.

1 Claim, 1 Drawing Sheet

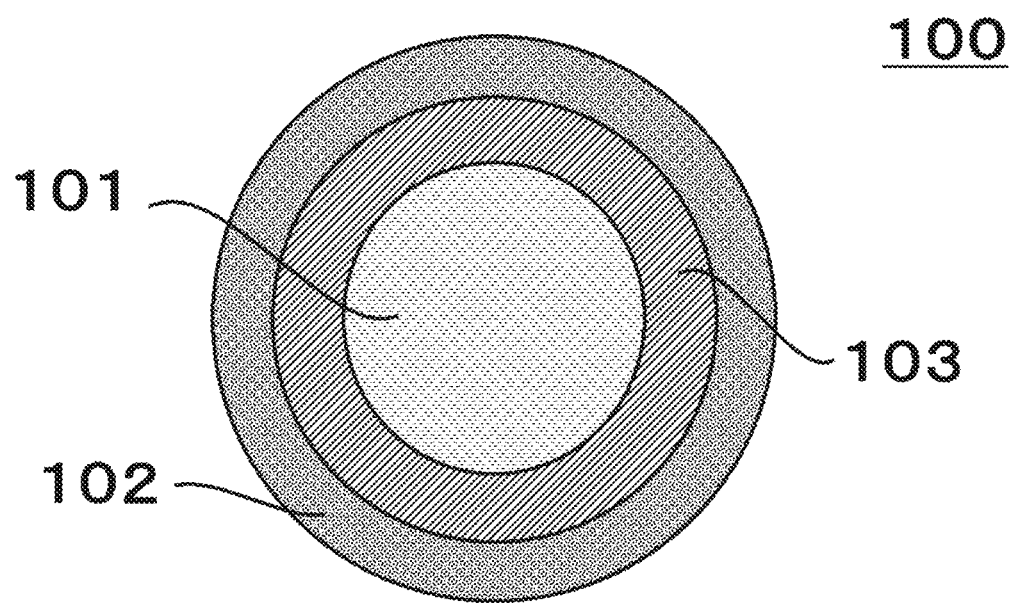

CORE-SHELL TYPE QUANTUM DOT AND METHOD FOR MANUFACTURING CORE-SHELL TYPE QUANTUM DOT

TECHNICAL FIELD

The present invention relates to a core-shell type quantum dot and a method for manufacturing a core-shell type quantum dot.

BACKGROUND ART

In a semiconductor nanoparticle single crystal, when crystal size becomes smaller than Bohr radius of excitons, a strong quantum confinement effect occurs and energy levels become discrete. The energy level depends on the crystal size, and the light absorption wavelength and the emission wavelength can be adjusted by the crystal size. In addition, the emission due to exciton recombination of the semiconductor nanoparticle single crystal becomes highly efficient due to the quantum confinement effect, and the emission is basically a emission line. It is attracting attention because it enables narrow-band light emission if a particle size distribution with uniform size can be realized. The phenomenon caused by the strong quantum confinement effect in such nanoparticles is called the quantum size effect, and studies are being conducted to widely apply and develop semiconductor nanocrystals utilizing this property as quantum dots.

As an application of quantum dots, its use as a fluorescent material for displays has been studied. If it is possible to realize high-efficiency light emission in a narrow band, it becomes possible to express colors that could not be reproduced by existing technology, so it is attracting attention as a next generation display material. However, although CdSe has been studied as a quantum dot having the best emission characteristics, its high toxicity limits its use, and it has been necessary to study a Cd-free material.

Therefore, the material that attracted attention is the quantum dot with InP as the core. In 1996, three years after CdSe was reported by a MIT group, visible light emission has been confirmed (Non Patent Document 1), and then due to the quantum size effect, it has been clarified that it can cover RGB (red: λ=630 nm 1.97 eV, green: λ=532 nm, blue: λ=465 nm), and has been energetically studied.

However, it is known that InP is inferior in optical characteristics to CdSe. One of the problems is the improvement of the quantum efficiency of InP quantum dots. Since the surface of quantum dots, which are basically nano-sized semiconductor crystal particles, is very active, and cores with a small bandgap are extremely reactive. When cores such as CdSe and InP alone are used, defects such as dangling bonds are likely to generate on the crystal surface. Therefore, core-shell type semiconductor crystal particles are manufactured using as the shell, semiconductor nanocrystals with a larger bandgap than the core and smaller lattice mismatch and quantum efficiency close to 100% can be obtained with CdSe-based quantum dots. On the other hand, in the case of quantum dots having InP as the core, the quantum efficiency is similarly improved by covering the shell, but the quantum efficiency is only 60% to 80%, and improvement in the quantum efficiency is desired.

CITATION LIST

Non Patent Literature

Non Patent Document 1: Nozik et al. "Highly efficient band-edge emission from InP quantum dots". Appl. Phys. Lett. 68. 3150 (1996)

Non Patent Document 2: J. P. Park, J.-J. Lee, S.-W. Kim, "Highly luminescent InP/GaP/ZnS QDs emitting in the entire colorrange via a heating up process", Sci. Rep. 6: 30094 (2016)

Non Patent Document 3: Yang Li, Xiaoqi Hou, Xingliang Dai, Zhenlei Yao, Liulin Lv, Yizheng Jin, and Xiaogang Peng, "Stoichiometry-controlled InP-based quantum dots: synthesis, photoluminescence, and electroluminescence", J. Am. Chem. Soc. 2019, 141, 6448-6452

SUMMARY OF INVENTION

Technical Problem

There are two reasons why the quantum efficiency of quantum dots with InP as the core is low. One of the reasons is defects at the core-shell interface due to the formation of a group II-VI shell with respect to a group III-V core. Defects at the core-shell interface are due to differences in valence, and it is obvious that defects generate when valence III and valence II ions are mixed. To the defect of the core-shell interface, it has been clarified from Non-Patent Document 2 that the quantum efficiency can be improved by covering the InP core with a shell made of GaP and high quantum efficiency of 85% in green is achieved. This is because by forming a shell of GaP of the same family on the core of InP, which is a group III-V semiconductor crystal, it is possible to prevent the generation of defects between shells close to the core. However, by covering with GaP, it is easy to shift to a shorter wavelength, and red light emission has not been realized at present. In addition, GaP has lower oxidation resistance than ZnS, and it is necessary to further coat the ZnS shell for practical use. However, since a group III-V/group II-VI semiconductor interface is generated, there is a limit to the improvement of quantum efficiency.

Another reason for the low quantum efficiency is considered that excess $In^{3+}$ ions left over during core synthesis are taken in at the time of the group II-VI semiconductor shell coating, and generate defects and reduce the quantum efficiency. When synthesizing the InP core, if the In precursor and the P precursor are adjusted so as to have a stoichiometric composition, the luminous characteristics becomes poor, and if the amount of the In precursor is larger than that of the P precursor, the particle size distribution can be improved and the half-value width of about 40 nm can be produced, so the In precursor is left over after core synthesis. As an improvement method disclosed in Non-Patent Document 3, in which improving the quantum efficiency to 90% or more, comprising, after the synthesis of an InP core, covering with a thin shell of ZnSe to give stability, and then purified to remove excess $In^{3+}$ ions during synthesis, and further coating with a ZnSe shell and a ZnS shell. However, this method is unsuitable for practical use because the number of steps increases with purification, and it is difficult to scale up because it cannot be continuously synthesized in one pot. Therefore, a simpler manufacturing method is required.

As described above, the quantum dot using the group III-V semiconductor nanocrystal as a core has a problem that the quantum efficiency does not increase because a defect generates between the core and the group II-VI semiconductor nanocrystal shell. In addition, during InP synthesis, if the amount of In precursor is small, the emission characteristics deteriorate, so synthesis with a stoichiometric composition is not possible. And as a result of synthesis with an increased amount of In precursor, excess $In^{3+}$ ions are left over and incorporated into the group II-VI semiconductor nanocrystal shell to generate defects.

The present invention has been made in view of the above problems, and an object of the present invention is to provide a quantum dot having improved fluorescence luminous efficiency and a method for manufacturing the same.

Solution to Problem

The present invention has been made to achieve the above object, and provides a core-shell type quantum dot comprising, a semiconductor nanocrystal core including at least In and P, and having group III-V elements as constituent elements and a single or a plurality of semiconductor nanocrystal shells having group II-VI elements as constituent elements covering the semiconductor nanocrystal core, wherein a buffer layer comprising semiconductor nanocrystals having group II-V elements as constituent elements is included between the semiconductor nanocrystal core and the semiconductor nanocrystal shell.

According to such a core-shell type quantum dot, even when a semiconductor nanocrystal having a group III-V element as a constituent element is used as a core, the quantum dot has improved fluorescence luminous efficiency.

At this time, the core-shell type quantum dot can have the semiconductor nanocrystal core containing at least InP and further containing a semiconductor nanocrystal selected from GaP and AlP or a mixed crystal thereof.

As a result, the quantum dot has an improved half-value width of light emission.

At this time, the core-shell type quantum dot can have the semiconductor nanocrystal shell containing one or more selected from ZnSe, ZnS, or a mixed crystal thereof.

This results in the quantum dot with even higher fluorescence luminous efficiency.

At this time, the core-shell type quantum dot can have the semiconductor nanocrystal having the Group II-V element as a constituent element in the buffer layer is $Zn_3P_2$.

As a result, the bandgap of $Zn_3P_2$ is larger than that of InP, which makes it more suitable as a shell.

At this time, there is provided a method for manufacturing core-shell type quantum type dots comprising, a step of synthesizing a semiconductor nanocrystal core including at least In and P, and having group III-V elements as constituent elements by reacting a group III element precursor containing at least In with a group V element precursor containing at least P in a solution, and, a step of forming a buffer layer comprising semiconductor nanocrystals having group II-V elements as constituent elements on the semiconductor nanocrystal core by mixing and reacting a solution containing the semiconductor nanocrystal core with a solution in which a group II element precursor is dissolved and the solution in which a group V element precursor is dissolved, a step of forming a single or a plurality of semiconductor nanocrystal shells having group II-VI elements as constituent elements on the buffer layer by mixing and reacting a solution containing the semiconductor nanocrystal core on which the buffer layer is formed with a solution in which a group II element precursor is dissolved and a solution in which a group VI element precursor is dissolved.

As a result, even when a semiconductor nanocrystal having a group III-V element as a constituent element is used as a core, quantum dots with improved fluorescence luminous efficiency can be produced.

At this time, the method for manufacturing a core-shell type quantum dot can be a method in the step of synthesizing the semiconductor nanocrystal core, in the chemical stoichiometric ratio of the group III element precursor and the group V element precursor to be reacted, a condition that the group III element precursor is excessively present than stoichiometric ratio of the group III element and the group V element in the semiconductor nanocrystal core, and, in the step of forming the buffer layer, the group V element precursor is reacted with the mixture containing the excess of the group III element precursor and the group II element precursor.

This makes it possible to manufacture quantum dots with further improved fluorescence luminous efficiency.

Advantageous Effects of Invention

As described above, according to the present invention, it becomes possible to reduce defects due to excess In precursor left over during the core synthesis, and at the nanoparticle shell interface between the group III-V semiconductor nanoparticle core and the group II-VI semiconductor nanoparticle shell by forming the buffer layer at the core-shell interface. As a result, it becomes possible to provide quantum dots with improved fluorescence luminous efficiency (quantum efficiency) and a manufacturing method that can be easily scaled up.

BRIEF DESCRIPTION OF DRAWING

FIG. 1 shows a conceptual diagram (cross-sectional view) of a core-shell type quantum dot according to the present invention.

DESCRIPTION OF EMBODIMENTS

Hereinafter, the present invention will be described in detail, but the present invention is not limited thereto.

As described above, it has been required to improve the fluorescence luminous efficiency in the core-shell type quantum dots using the group III-V semiconductor nanocrystals as the core.

As a result of diligent studies on the above problems, the present inventors have found a core-shell type quantum dot comprising, a semiconductor nanocrystal core including at least In and P, and having group III-V elements as constituent elements and a single or a plurality of semiconductor nanocrystal shells having group II-VI elements as constituent elements covering the semiconductor nanocrystal core, wherein a buffer layer comprising semiconductor nanocrystals having group II-V elements as constituent elements is included between the semiconductor nanocrystal core and the semiconductor nanocrystal shell, to be a quantum dot with improved fluorescence luminous efficiency (quantum efficiency) even when semiconductor nanocrystals containing group III-V elements as constituent elements are used as cores, and have completed the invention.

Further, the present inventors have found by a method for manufacturing core-shell type quantum type dots comprising, a step of synthesizing a semiconductor nanocrystal core including at least In and P, and having group III-V elements as constituent elements by reacting a group III element precursor containing at least In with a group V element precursor containing at least P in a solution, and, a step of forming a buffer layer comprising semiconductor nanocrystals having group II-V elements as constituent elements on the semiconductor nanocrystal core by mixing and reacting a solution containing the semiconductor nanocrystal core with a solution in which a group II element precursor is dissolved and the solution in which a group V element precursor is dissolved, a step of forming a single or a plurality of semiconductor nanocrystal shells having group II-VI elements as constituent elements on the buffer layer by mixing and reacting a solution containing the semiconductor nanocrystal core on which the buffer layer is formed with a solution in which a group II element precursor is dissolved and a solution in which a group VI element precursor is dissolved, a quantum dot with improved fluorescent luminous efficiency (quantum efficiency) can be produced even when a semiconductor nanocrystal having a group III-V element as a constituent element is used as a core, and have completed the invention.

Hereinafter, description will be given with reference to the drawings.

First, the core-shell type quantum dots according to the present invention will be described.

As described above, as a result of intensive studies on the problem of improving the fluorescence luminous efficiency (quantum efficiency) of quantum dots made of group III-V semiconductor nanoparticles, it has been found that the fluorescence luminous efficiency (quantum efficiency) can be improved by using the quantum dots 100 having a structure as shown in the cross-sectional view of FIG. 1. The present inventors have found that the fluorescence luminous efficiency (quantum efficiency) is improved by forming the buffer layer 103 containing the group II-V semiconductor nanocrystals between the core and the shell of the core-shell type quantum dots composed of a semiconductor nanocrystal core 101 consisting of a group III-V containing In and P, and a single or a plurality of semiconductor nanocrystal shells 102 consisting of a group II-VI covering the core.

The semiconductor nanocrystal core according to the present invention preferably contains at least InP, and preferably further contains semiconductor nanocrystals selected from GaP and AlP or a mixed crystal thereof. Since InP has a small effective mass and a large quantum size effect, even a slight change in the particle size causes a large shift in the emission wavelength. However, Ga and Al have a relatively large effective mass, and the half-value width of light emission is improved by doping. Since the emission wavelength tends to shift to a shorter wavelength, the optimum addition amount may be appropriately examined.

In the semiconductor nanocrystal shell according to the present invention, it is preferable to form a shell containing at least one selected from ZnSe, ZnS or a mixed crystal thereof. Further, in this case, it is more preferable to form a mixed crystal of ZnSe and ZnS between them. This is because it is possible to more effectively suppress the decrease in quantum efficiency due to the lattice mismatch when the ZnS shell is formed on the ZnSe shell. Further, since ZnS is stable in the atmosphere, it is preferable to cover the outermost surface with ZnS.

In the buffer layer according to the present invention, it is preferable to use $Zn_3P_2$ as the group II-V semiconductor nanocrystals. $Zn_3P_2$ is a direct transition type semiconductor having a tetragonal anti-fluorite structure, and has a bandgap of about 1.5 eV, which is larger than that of 1.28 eV of InP, and can be suitably used as a shell. In addition, the tetragonal anti-fluorite structure is similar to the sphalerite type structure such as InP and CdSe, and compatibility can be expected with the group III-V semiconductor nanocrystals derived from the group III element precursor left over during the synthesis of the group III-V semiconductor nanoparticle core. Further, regarding the difference in valence at the core-shell interface, since the P atom contained in the core and the Zn atom contained in the shell are contained, it is possible to more effectively suppress the generation of defects.

To confirm the formation of the buffer layer, for example, a particle image obtained by a transmission electron microscope (TEM) is measured, an increase in particle size is measured, and energy dispersive X-ray spectrum (EDX) can be used for elemental analysis, which can be confirmed by calculating the ratio of elements such as Zn and P after forming the buffer layer.

Further, in the core-shell type quantum dot of the present invention, it is desirable that an organic ligand called a ligand is coordinated on the surface in order to impart dispersibility and reduce surface defects.

The ligand preferably contains an aliphatic hydrocarbon from the viewpoint of improving dispersibility in a nonpolar solvent. As examples of such ligands, oleic acid, stearic acid, palmitic acid, myristic acid, lauric acid, decanoic acid, octanoic acid, oleylamine, stearyl (octadecyl) amine, dodecyl (lauryl) amine, decylamine, octylamine, octadecane thiol, hexadecane thiol, tetradecane thiol, dodecane thiol, decane thiol, octane thiol, trioctylphosphine, trioctylphosphine oxide, triphenylphosphine, triphenylphosphine oxide, tributylphosphine, tributylphosphine oxide, or the like can be mentioned and it may be used alone or in combination of two or more.

The method for manufacturing the core-shell type quantum dot according to the present invention is described in detail below.

The core-shell type quantum dot according to the present invention comprises a semiconductor nanocrystal core containing at least In and P and having a group III-V element as a constituent element, a semiconductor nanocrystal shell containing a group II-VI element as a constituent element and a buffer layer containing semiconductor nanocrystals having a group II-V element as a constituent element between them.

(Core Synthesis Step)

The semiconductor nanocrystal core according to the present invention can be synthesized by reacting a group III element precursor containing at least In with a group V element precursor containing at least P in a solution. For example, a group III-V semiconductor nanocrystal core can be synthesized by adding a group V element precursor solution to a solution containing a group III element precursor under high temperature conditions of 150° C. or higher and 350° C. or lower. In the step of synthesizing such a semiconductor nanocrystal core, for the purpose of suppressing the decomposition of the precursor under high temperature conditions and the aggregation after the core synthesis, it is desirable to add the group III element precursor and the group V element precursor to the solutions in which the ligand is dissolved and dissolve each of the them respectively.

As examples of group III element precursors, indium chloride, indium bromide, indium iodide, indium oxide, indium nitrate, indium sulfate, indium acetate, aluminum chloride, aluminum bromide, acetylacetonato aluminum, aluminum oxide, aluminum sulfate, aluminum nitrate, gallium chloride, acetylacetonato gallium, gallium oxide, gallium nitrate, gallium sulfate or the like can be mentioned.

Of these, the raw material may be selected according to the reactivity of the group V element precursor to be reacted, and it is known that good crystals can be obtained even when, for example, trisdimethylamino phosphine having low reactivity is used. It is advisable to select as appropriate, such as using a halide.

The method for dissolving the group III element precursor in the solvent is not particularly limited, and for example, a method for dissolving by heating to a temperature of 100° C. to 180° C. is desirable. In particular, it is preferable to reduce the pressure at this time because dissolved oxygen and water can be removed from the dissolved solution.

The solvent is not particularly limited and may be appropriately selected depending on the synthesis temperature and the solubility of the precursor. For example, aliphatic unsaturated hydrocarbons such as 1-octadecene, 1-hexadecene and 1-dodecene, aliphatic saturated hydrocarbons such as n-octadecane, n-hexadecane and n-dodecane, phosphines and amines having long-chain alkyl groups such as alkylphosphins such as trioctylphosphine, oleylamine, dodecylamine and hexadecylamine can be preferably used.

The Group V element precursor may be appropriately selected from the viewpoint of controlling the reactivity so that a desired particle size and particle size distribution can be obtained, and may be selected from, for example, tristrimethylsilylphosphine and trisdimethylaminophosphine or the like. When using highly reactive tristrimethylsilylphosphine, it is advisable to dilute it with a solvent to control the reactivity and adjust the concentration appropriately for the reaction.

Similarly, the synthesis temperature and the holding time are not particularly limited because they can be appropriately adjusted so as to obtain a desired particle size and particle size distribution. In the stoichiometric ratio of the group III element precursor and the group V element precursor, as for the stoichiometric ratio of the group III element precursor and the group V element precursor to be reacted, it is preferable to set the condition that group III element precursor is excessively present compared to the stoichiometric ratio of the group III element and the group V element in the semiconductor nanocrystal core, to improve luminous characteristics. Specifically, for example, it is preferable to adjust the molar ratio of the group III element precursor to the group V element precursor to be 3:2, 2:1, 3:1, etc., but since the conditions for obtaining the optimum optical characteristics change depending on the reactivity, concentration, temperature and the like of the raw materials, it is desirable to appropriately adjust them.

(Buffer Layer Synthesis Step)

A buffer layer containing semiconductor nanocrystals containing group II-V elements as constituent elements is formed on the top of the semiconductor nanocrystal core by mixing and reacting the solution containing the semiconductor nanocrystal core obtained as described above with the solution in which the group II element precursor is dissolved and the solution in which the group V element precursor is dissolved. At this time, for the sake of simplification of production, the reaction solution after the core synthesis step described above is continuously used, and the solution in which the group II element precursor is dissolved is added to form a mixture, and to the mixture of the excess group III element precursor and the solution containing the group II element precursor, the group V element precursor is preferably reacted to grow the buffer layer. Further, for the purpose of suppressing aggregation after the synthesis of the buffer layer, it is desirable to add and dissolve the group II element precursor and the group V element precursor to the solution in which the ligand is dissolved, respectively.

The group V element precursor may be appropriately selected from the viewpoint of controlling the reactivity so that the desired particle size and particle size distribution can be obtained, as in the method shown in the core synthesis step. For example, tristrimethylsilylphosphine or trisdimethylaminophosphine may be selected. When using highly reactive tristrimethylsilylphosphine, it is advisable to dilute it with a solvent to control the reactivity and adjust the concentration appropriately for the reaction.

As examples of group II element precursors zinc fluoride, zinc chloride, zinc bromide, zinc iodide, zinc acetate, acetylacetonatozinc, zinc oxide, zinc carbonate, zinc carboxylate salt, dimethyl zinc, diethyl zinc, zinc nitrate, zinc sulfate or the like can be mentioned.

A plurality of methods for producing group II-V semiconductor nanocrystals have been published. A method of reacting zinc stearate with tristrimethylsilylphosphine, a method of reacting diethylzinc with tristrimethylsilylphosphine, a method of reacting multiple zinc precursors (diethylzinc and zinc carboxylate salt) with tristrimethylsilylphosphine, and a method of reacting diethylzinc with $PH_3$ have been mentioned. Of these, the methods for synthesizing $Zn_3P_2$ nanoparticles with observable luminescence are all methods using diethylzinc, and it is preferable to use diethylzinc as a group II element precursor. The method of reacting multiple zinc precursors (diethylzinc and zinc carboxylate salt) with tristrimethylsilylphosphine is particularly effective because it can be grown using the excess zinc carboxylate salt during later shell synthesis. However, as will be described later, when the group III element precursor remains in the solution after the core synthesis, the group III-V nanocrystals grow at the same time. Since a good buffer layer can be produced in the cases zinc carboxylate salt or zinc halide was used, these raw materials can also be suitably used, and the zinc precursor is not particularly limited. Further, the synthesis temperature and the holding time are not particularly limited because they can be appropriately adjusted so as to obtain desired characteristics.

The method for dissolving the solid group II element precursor raw material in the solvent is not particularly limited, and for example, a method for dissolving by heating to a temperature of 100° C. to 180° C. is desirable. In particular, it is preferable to reduce the pressure at this time because dissolved oxygen and water can be removed from the dissolved solution.

(Shell Synthesis Step)

A single or a plurality of semiconductor nanocrystal shells containing group II-VI elements as constituent elements is formed on the buffer layer by mixing and reacting the solution containing the semiconductor nanocrystal core in which a buffer layer containing semiconductor nanocrystals containing group II-V elements as constituent elements is formed with the solution in which the group II element precursor is dissolved and the solution in which the group VI element precursor is dissolved. At this time, in order to simplify the production, it is preferable to continue to use the reaction solution after the buffer layer synthesis step described above to grow the shell. The shell structure is preferably a shell structure containing ZnSe, ZnS or a mixed crystal thereof, and is not particularly limited, but it is preferable to use ZnS from the viewpoint of stability. For the purpose of suppressing aggregation after shell synthesis, it is desirable to add and dissolve group II element precursors and group VI element precursors, respectively, to the solution in which the ligand is dissolved. In the reaction, a group II element precursor solution is added to the reaction solution after the buffer layer synthesis step to prepare a mixed solution, and then the group VI element precursor solution is added under high temperature condition of 150° C. or higher and 350° C. or lower. Then, the II-VI group semiconductor nanocrystal shell can be synthesized.

As the Group II element precursor, for example, zinc fluoride, zinc chloride, zinc bromide, zinc iodide, zinc acetate, acetylacetonatozinc, zinc oxide, zinc carbonate, zinc carboxylate salt, dimethyl zinc, diethyl zinc, zinc nitrate, zinc sulfate or the like can be mentioned as in the buffer layer synthesis step. Since high reactivity is not required in the synthesis of shells, zinc carboxylate salt, zinc acetate, and zinc halide can be preferably used because of their ease of handling and compatibility with solvents. The method for dissolving the solid group II element precursor raw material in the solvent is not particularly limited, and for example, a method for dissolving by heating to a temperature of 100° C. to 180° C. is desirable. In particular, it is preferable to reduce the pressure at this time because dissolved oxygen and water can be removed from the dissolved solution.

As examples of the group VI element precursor, sulfur, alkylthiol, trialkylphosphine sulfide, bistrialkylsilylsulfide, selenium, trialkylphosphine selenide, trialkenylphosphine selenide, and bistrialkylsilyl selenide or the like can be mentioned. Of these, as the sulfur source, an alkylthiol having a long-chain alkyl group such as dodecanethiol is preferable from the viewpoint of dispersion stability of the obtained core-shell particles. The method for dissolving the solid group VI element precursor raw material in the solvent is not particularly limited, and for example, a method for dissolving by heating to a temperature of 100° C. to 180° C. is desirable.

Further, since the quantum efficiency is further improved by increasing the number of layers of the shell structure, it is particularly preferable to synthesize a ZnSe shell, then a mixed crystal shell of ZnSe and ZnS, and finally a ZnS shell. The decrease in quantum efficiency due to lattice mismatch when the ZnS shell is formed on the ZnSe shell can be suppressed more effectively, and the stability of the quantum dots becomes higher due to the ZnS that is stable even in the atmosphere.

EXAMPLE

Hereinafter, the present invention will be described in detail with reference to examples, but this is not limited to the present invention.

Example 1

(Core Synthesis Step)

Into a flask, 0.23 g (0.9 mmol) of palmitic acid, 0.088 g (0.3 mmol) of indium acetate, and 10 mL of 1-octadecene were added, and the mixture was heated and stirred at 100° C. under reduced pressure to dissolve the raw materials and degassing was performed for 1 hour. Then, nitrogen was purged into the flask and heated to 300° C. When the temperature of the solution became stable, 0.75 mL (0.15 mmol) of the solution prepared by mixing tristrimethylsilylphosphine with trioctylphosphine to 0.2 M was added, and the mixture was reacted for 20 minutes. It was confirmed that the solution was colored red and core particles were formed.

(Buffer Layer Synthesis Step)

Next, 0.3 M of octadecene zinc stearate solution was prepared by adding 2.85 g (4.5 mmol) of zinc stearate and 15 mL of 1-octadecene into another flask, and being heated and stirred at 100° C. under reduced pressure, and degassing for 1 hour while being dissolved and 0.5 mL (0.15 mmol) of the solution was added to the reaction solution after the core synthesis, and the mixture was cooled to 100° C. Then, a solution was prepared by adding 0.15 mmol of diethylzinc, 0.25 mmol of tristrimethylsilylphosphine, and 2 mL of trioctylphosphine into a Schlenk tube in a glovebox, hermetically removed from the glovebox, and the whole amount was added to the reaction solution. Then, the temperature was raised to 300° C. for 1 hour, held for 10 minutes, and then cooled to 200° C.

(Shell Synthesis Step)

1.5 M of selenium trioctylphosphine solution was prepared by adding 0.474 g (6 mmol) of selenium and 4 mL of trioctylphosphine into another flask, being heated to 150° C. to dissolve, and 0.1 mL was added to the reaction solution after the buffer layer step being cooled to 200° C., then the temperature was raised to 250° C. for 30 minutes, the temperature was maintained for 10 minutes, and then the mixture was cooled to room temperature. 0.44 g (2.2 mmol) of zinc acetate was added, and the mixture was dissolved by heating and stirring at 100° C. under reduced pressure. The inside of the flask was purged with nitrogen again, the temperature was raised to 230° C., 0.98 mL (4 mmol) of 1-dodecanethiol was added, and the temperature was maintained for 1 hour. The obtained solution was cooled to room temperature, ethanol was added, and the mixture was centrifuged to precipitate nanoparticles and remove the supernatant. Hexane was further added to disperse, ethanol was added again to centrifuge, the supernatant was removed and redispersed in hexane to prepare a hexane solution of InP/InP:$Zn_3P_2$/ZnSe/ZnS core-shell type quantum dots.

Comparative Example 1

The hexane solution of InP/ZnSe/ZnS core-shell type quantum dots was used as Comparative Example 1 in the same manner as in Example 1 except that the buffer layer synthesis step was not performed.

Example 2

(Core Synthesis Step)

Into a flask, 0.23 g (0.9 mmol) of palmitic acid, 0.088 g (0.3 mmol) of indium acetate, and 10 mL of 1-octadecene were added, and the mixture was heated and stirred at 100° C. under reduced pressure to dissolve the raw materials and degassing was performed for 1 hour. Then, nitrogen was purged into the flask and heated to 300° C. When the temperature of the solution became stable, 0.75 mL (0.15 mmol) of the solution prepared by mixing tristrimethylsilylphosphine with trioctylphosphine to 0.2 M was added and reacted for 20 minutes. It was confirmed that the solution was colored red and core particles were formed. The reaction solution was cooled to 100° C.

(Buffer Layer Synthesis Step)

Next, 0.02 g (0.15 mmol) of zinc chloride and 4 mL of oleylamine were added to another flask, and the mixture was heated and stirred at 100° C. under reduced pressure and degassed for 1 hour while being dissolved. The whole amount was added to the reaction solution cooled to 100° C. Then, the mixture was heated to 180° C., 0.25 mmol of trisdiethylaminophosphine was added and held for 10 minutes, and then the temperature was raised to 300° C. for 1 hour.

(Shell Synthesis Step)

Next, 0.3 M of octadecene zinc stearate solution was prepared by adding 2.85 g (4.5 mmol) of zinc stearate and 15 mL of 1-octadecene into another flask, and the mixture being heated and stirred at 100° C. under reduced pressure, and being degassed for 1 hour while being dissolved, then, 0.5 mL (0.15 mmol) of this solution was added to the reaction solution after the synthesis of the buffer layer, and the mixture was cooled to 200° C.

1.5 M of selenium trioctylphosphine solution was prepared by adding 0.474 g (6 mmol) of selenium and 4 mL of trioctylphosphine into another flask, being heated to 150° C. to dissolve, and 0.1 mL this solution was added to the reaction solution after the buffer layer step being cooled to 200° C., then the temperature was raised to 250° C. for 30 minutes, the temperature was maintained for 10 minutes, and then the mixture was cooled to room temperature. 0.44 g (2.2 mmol) of zinc acetate was added, and the mixture was dissolved by heating and stirring at 100° C. under reduced pressure. The inside of the flask was purged with nitrogen again, the temperature was raised to 230° C., 0.98 mL (4 mmol) of 1-dodecanethiol was added, and the temperature was maintained for 1 hour. The obtained solution was cooled to room temperature, ethanol was added, and the mixture was centrifuged to precipitate nanoparticles and remove the supernatant. Hexane was further added to disperse, ethanol was added again to centrifuge, the supernatant was removed and redispersed in hexane to prepare a hexane solution of InP/InP:$Zn_3P_2$/ZnSe/ZnS core-shell type quantum dots.

[Evaluation]

(Measurement of Average Particle Size)

To measure the average particle size, 20 particles were directly observed with a transmission electron microscope (TEM), the diameter of a circle having the same area as the projected area of the particles was calculated, and the average value of them was used.

(Elemental Analysis)

After the core synthesis, the buffer layer synthesis, and the shell synthesis, samples were taken respectively, ethanol was added to precipitate particles, and hexane was added to redispersed to prepare the sample solutions for each step. Elemental analysis was performed by energy dispersive X-ray spectroscopy analysis (EDX), and the ratios of In, P, Zn, Se, and S elements were calculated.

(Emission Wavelength, Emission Half-Value Width, Emission Efficiency Measurement)

In Examples and Comparative Examples, as evaluation of fluorescence luminous characteristics of quantum dots, the emission wavelength, fluorescence emission half-value width, and fluorescence luminous efficiency (internal quantum efficiency) at an excitation wavelength of 450 nm were measured using a quantum efficiency measurement system (QE-2100) manufactured by Otsuka Electronics Co., Ltd. The measurement results of Examples 1 and 2 and Comparative Example 1 are summarized in Table 1 below.

TABLE 1

|  |  | Core synthesis step | | Buffer layer synthesis step | | Shell synthesis step | |
|---|---|---|---|---|---|---|---|
| Example 1 | Average particle size | 2.91 | nm | 4.1 | nm | 7.21 | nm |
| | Elemental In | 52.1 | % | 34.3 | % | 4.6 | % |
| | analysis P | 47.9 | % | 46.1 | % | 6.1 | % |
| | Zn | — | % | 29.6 | % | 41.1 | % |
| | Se | — | % | — | % | 2.4 | % |
| | S | — | % | — | % | 45.8 | % |
| | Emission wavelength | | | | | 533 | nm |
| | Emission half-value width | | | | | 41 | nm |
| | Internal quantum efficiency | | | | | 78 | % |
| Comparative Example 1 | Average particle size | 2.94 | nm | — | nm | 5.82 | nm |
| | Elemental In | 51.1 | % | — | % | 3.8 | % |
| | analysis P | 48.9 | % | — | % | 1.9 | % |
| | Zn | — | % | — | % | 34.8 | % |

TABLE 1-continued

|  |  | Core synthesis step | | Buffer layer synthesis step | | Shell synthesis step | |
|---|---|---|---|---|---|---|---|
| | Se | — | % | — | % | 19.8 | % |
| | S | — | % | — | % | 39.7 | % |
| | Emission wavelength | | | | | 511 | nm |
| | Emission half-value width | | | | | 42 | nm |
| | Internal quantum efficiency | | | | | 61 | % |
| Example 2 | Average particle size | 2.98 | nm | 3.98 | nm | 7.33 | nm |
| | Elemental In | 52.3 | % | 34.3 | % | 4.4 | % |
| | analysis P | 47.7 | % | 46.1 | % | 6.4 | % |
| | Zn | — | % | 29.6 | % | 41.8 | % |
| | Se | — | % | — | % | 2.1 | % |
| | S | — | % | — | % | 45.3 | % |
| | Emission wavelength | | | | | 538 | nm |
| | Emission half-value width | | | | | 41 | nm |
| | Internal quantum efficiency | | | | | 81 | % |

As described above, in Examples 1 and 2, after the buffer layer synthesis, the average particle size became larger by about 1 nm than after the core synthesis, and zinc element was detected by elemental analysis. Although the ratio was slightly different from that in which InP/$Zn_3P_2$ was formed, it corresponded relatively well with the added raw material ratio, and it was considered that the buffer layer containing $Zn_3P_2$ was formed. Comparing the luminous characteristics after synthesizing the shells, the emission wavelengths of Examples 1 and 2 were shifted to a longer wavelength than that of Comparative Example 1, and the excess In precursor after the core synthesis also reacted during the buffer layer synthesis. As the reaction progresses, it seemed that the core particle size had become relatively larger. The half-value width did not change with or without buffer layer formation. It was confirmed that the fluorescence luminous efficiency (internal quantum efficiency) of Examples 1 and 2 was higher than that of Comparative Example 1, indicating that the buffer layer was effective in improving the quantum efficiency. Further, it was shown that the emission wavelength could be easily adjusted because the longer wavelength shift accompanied by the deterioration of the half-value width due to aggregation did not occur even if the buffer layer is formed. In addition, it was shown that the synthesis method could be easily scaled up because core synthesis, buffer layer synthesis, and shell synthesis could be continuously performed.

The present invention is not limited to the above embodiment. The above-described embodiment is an example, and any of the above-described embodiments having substantially the same configuration as the technical idea described in the claims of the present invention and having the same effect is included in the technical scope of the present invention.

The invention claimed is:

1. A method for manufacturing core-shell type quantum dots comprising,
a step of synthesizing a semiconductor nanocrystal core including at least In and P, and having group III-V elements as constituent elements by reacting a group III element precursor containing at least In with a group V element precursor containing at least P in a solution, wherein,
in the chemical stoichiometric ratio of the group III element precursor and the group V element precursor to be reacted, a condition that the group III element precursor is excessively present than stoichiometric ratio of the group III element and the group V element in the semiconductor nanocrystal core, and, a step of forming a buffer layer comprising semiconductor nanocrystals having group II-V elements as constituent elements on the semiconductor nanocrystal core by mixing and reacting a solution containing the semiconductor nanocrystal core and an excess of the group III element precursor with a solution in which a group II element precursor is dissolved and a solution in which a group V element precursor is dissolved, a step of forming a single or a plurality of semiconductor nanocrystal shells having group II-VI elements as constituent elements on the buffer layer by mixing and reacting a solution containing the semiconductor nanocrystal core on which the buffer layer is formed with a solution in which a group II element precursor is dissolved and a solution in which a group VI element precursor is dissolved.

\* \* \* \* \*